US011871291B2

(12) United States Patent
Shan et al.

(10) Patent No.: US 11,871,291 B2
(45) Date of Patent: Jan. 9, 2024

(54) DATA FORWARDING TUNNEL ESTABLISHMENT BETWEEN TWO USER PLANE FUNCTIONS IN FIFTH GENERATION

(71) Applicant: Apple Inc., Cupertino, CA (US)

(72) Inventors: Changhong Shan, Portland, OR (US); Yifan Yu, Beijing (CN); Alexandre Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 16/976,646

(22) PCT Filed: Jul. 24, 2018

(86) PCT No.: PCT/US2018/043551
§ 371 (c)(1),
(2) Date: Aug. 28, 2020

(87) PCT Pub. No.: WO2019/027742
PCT Pub. Date: Feb. 7, 2019

(65) Prior Publication Data
US 2021/0014765 A1    Jan. 14, 2021

Related U.S. Application Data

(60) Provisional application No. 62/541,589, filed on Aug. 4, 2017.

(51) Int. Cl.
*H04W 36/32*      (2009.01)
*H04W 76/12*      (2018.01)
(Continued)

(52) U.S. Cl.
CPC ............. *H04W 36/32* (2013.01); *H04W 8/02* (2013.01); *H04W 36/0011* (2013.01);
(Continued)

(58) Field of Classification Search
CPC ... H04W 36/32; H04W 8/02; H04W 36/0011; H04W 36/0055; H04W 36/14; H04W 76/12; H04W 92/20
See application file for complete search history.

(56) References Cited

U.S. PATENT DOCUMENTS

2015/0195749 A1    7/2015   Huang
2015/0282017 A1*  10/2015   Wang ..................... H04W 8/02
                                                      370/331
(Continued)

FOREIGN PATENT DOCUMENTS

KR    10-2015-0079927 A    7/2015

OTHER PUBLICATIONS

International Search Report dated Nov. 7, 2018 for International Application No. PCT/US2018/043551.
(Continued)

*Primary Examiner* — Margaret G Mastrodonato
(74) *Attorney, Agent, or Firm* — Eschweiler & Potashnik, LLC

(57) ABSTRACT

This disclosure describes systems, methods, and devices related to data forwarding tunnel establishment between two user plane functions in fifth generation (5G). A device may determine an association of an access and mobility management function (AMF) with a first radio access network (RAN). The device may identify a handover request message received from the first RAN via the AMF. The device may identify a request to establish an indirect data forwarding associated with the handover, wherein the request is received from the first RAN via the AMF. The device may cause to send a response addressed to the AMF indicating that the indirect data forwarding is established.

23 Claims, 12 Drawing Sheets

(51) Int. Cl.
*H04W 8/02* (2009.01)
*H04W 36/00* (2009.01)
*H04W 36/14* (2009.01)

(52) U.S. Cl.
CPC ....... *H04W 36/0055* (2013.01); *H04W 36/14* (2013.01); *H04W 76/12* (2018.02)

(56) References Cited

U.S. PATENT DOCUMENTS

| | | | | |
|---|---|---|---|---|
| 2018/0041931 | A1* | 2/2018 | Shimojou | H04W 36/12 |
| 2018/0167854 | A1* | 6/2018 | Enomoto | H04W 36/08 |
| 2018/0198867 | A1* | 7/2018 | Dao | H04W 36/0033 |
| 2018/0270778 | A1* | 9/2018 | Bharatia | H04L 65/1063 |
| 2018/0376384 | A1* | 12/2018 | Youn | H04W 36/0022 |
| 2019/0166647 | A1* | 5/2019 | Velev | H04W 76/00 |
| 2020/0008118 | A1* | 1/2020 | Han | H04W 36/30 |
| 2020/0112898 | A1* | 4/2020 | Ramle | H04W 36/08 |
| 2020/0120549 | A1* | 4/2020 | Sun | H04W 36/0016 |
| 2020/0120570 | A1* | 4/2020 | Youn | H04W 36/0033 |
| 2020/0154320 | A1* | 5/2020 | Xu | H04W 36/08 |
| 2021/0289402 | A1* | 9/2021 | Ke | H04W 40/36 |

OTHER PUBLICATIONS

International Preliminary Report on Patentability dated Feb. 4, 2020 for International Application No. PCT/US2018/043551.
ZTE et al., "TS 23.502 New N2 based intra AMF Inter NG-RAN node handover procedure," S2-175294, SA WG2 Meeting #122, San Jose Del Cabo, Mexico, Jul. 3, 2017, See pp. 3-7.
CATT, "TS 23.502: Indirect data forwarding for 5GS to EPS handover," S2-174585, SA WG2 Meeting #122, San Jose Del Cabo, Mexico, Jun. 20, 2017, See pp. 1-3.
China Telecom, "Update 5GS to EPS Handover Procedure", S2-174257, SA WG2 Meeting #122, San Jose Del Cabo, Mexico, Jun. 19, 2017, See pp. 1-5.

* cited by examiner

DATA FORWARDING TUNNEL ESTABLISHMENT BETWEEN TWO USER PLANE FUNCTIONS IN FIFTH GENERATION

CROSS-REFERENCE TO RELATED APPLICATION(S)

This application claims the benefit of U.S. Provisional Application No. 62/541,589, filed Aug. 4, 2017, the disclosure of which is incorporated herein by reference as if set forth in full.

TECHNICAL FIELD

This disclosure generally relates to systems, methods, and devices for wireless communications and, more particularly, to data forwarding tunnel establishment between two user plane functions in fifth generation (5G).

BACKGROUND

Wireless mobile communication technology uses various standards and protocols to transmit data between a base station and a wireless mobile device. Wireless communication system standards and protocols can include the 3rd Generation Partnership Project (3GPP) long-term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLANs), which is commonly known to industry groups as Wi-Fi. In 3GPP radio access networks (RANs) in LTE systems, the base station can include a RAN node, such as an Evolved Universal Terrestrial Radio Access Network (E-UTRAN) Node B (also commonly denoted as evolved Node B, enhanced Node B, eNodeB, or eNB), and/or a Radio Network Controller (RNC) in an E-UTRAN, which communicate with a wireless communication device, known as user equipment (UE). In fifth generation (5G) wireless RANs, RAN nodes can include a 5G Node (e.g., 5G eNB or gNB).

DETAILED DESCRIPTION

Figure 1:
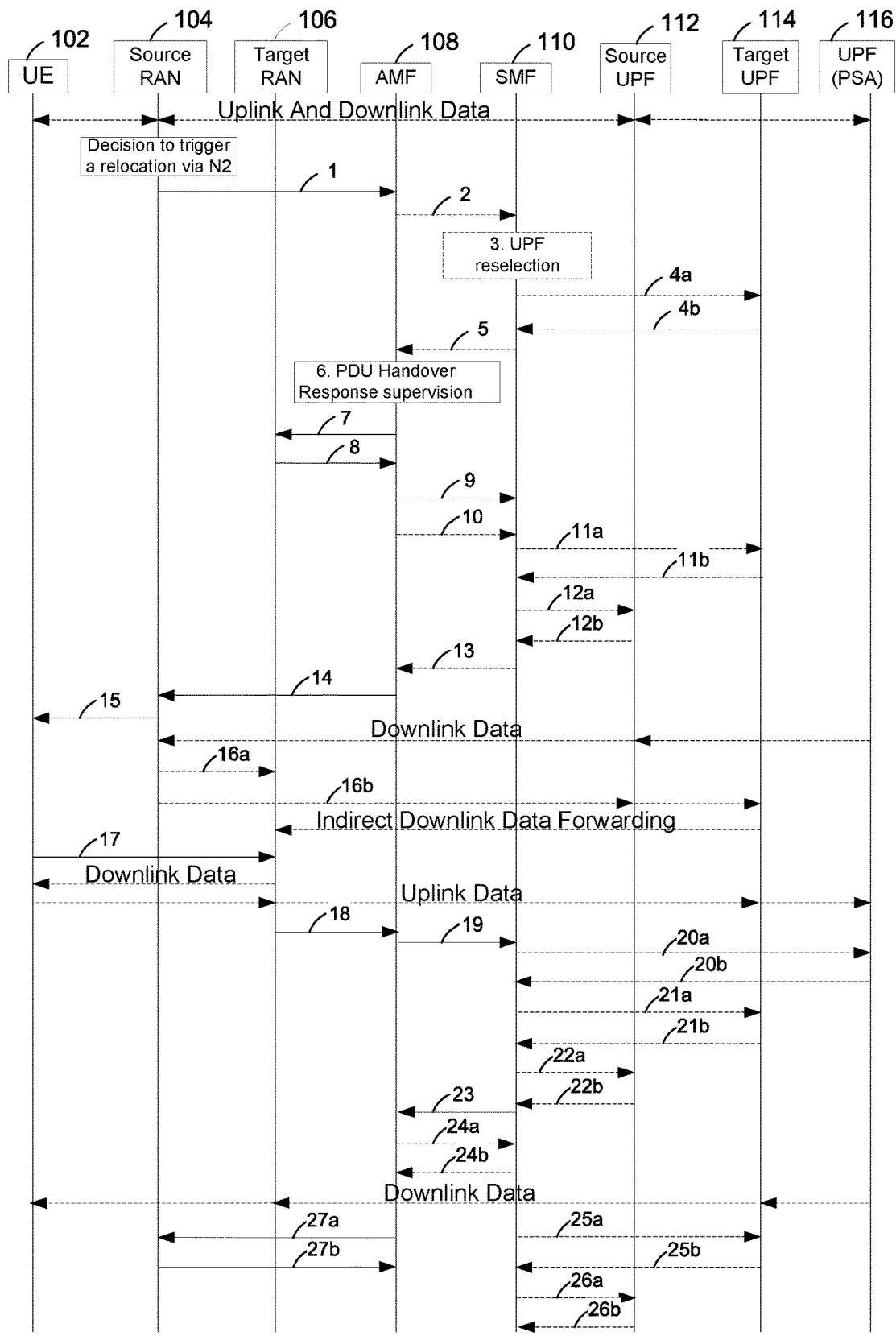
FIG. 1 depicts a diagram illustrating an N2 based handover with user plane function (UPF) relocation procedure, in accordance with one or more example embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Due to user equipment (UE) mobility, if an Xn interface between two fifth generation (5G) radio access network (RAN) nodes (e.g., next generation nodeBs (gNBs) and the like) is not available, the gNB may initiate N2 based handover by involving the Access and Mobility Function (AMF) and Session Management Function (SMF). During this procedure, the user plane function (UPF) (UL CL) will be relocated, the data forwarding tunnel between the source UPF and target UPF is needed for the purpose of lossless data. Currently, this data forwarding tunnel in the according procedure between the two UPFs does not exist, and there is no agreed-to solution to establish the data forwarding tunnel between the source RAN and target UPF.

In one or more embodiments, a data forwarding tunnel establishment system may introduce a mechanism for establishing an indirect data forwarding tunnel between a source RAN and a target RAN during handover. During a handover procedure, if the downlink data is not forwarded from the source RAN to the target RAN, the downlink data, or portions of downlink data will be lost, which could also end the handover procedure.

In one or more embodiments, a device (e.g., a UE) may be connected to a 5G network. When the UE moves around and needs to handover from a source RAN to a target RAN, some downlink data may sent to the source RAN after the UE has left the source RAN. Therefore, if no data forwarding tunnel exists between the source RAN and the target RAN, then the downlink data forwarded to the source RAN will be lost causing data integrity issues.

In one or more embodiments, a data forwarding tunnel establishment system may apply to scenarios where a source RAN and a target RAN in a handover procedure that do not have a direct connection between them to allow for direct downlink data forward. In that case, an indirect data forwarding may be needed.

In one or more embodiments, a data forwarding tunnel establishment system may facilitate that a source RAN needs to determine when an indirect forwarding is needed between the source UPF and target UPF. The source RAN node may decide to initiate an N2-based handover to the target RAN node due to e.g., no Xn connectivity to the target RAN node or the target RAN has no IP connectivity with source UPF based on its configuration or Xn based handover preparation failure due to target RAN informing that there is no IP connectivity between target RAN and source UPF. The source RAN node sends a Handover Required message (Target ID, Source to Target transparent container, SM N2 info list including PDU session IDs, reason for N2 based handover (e.g., no Xn interface between the source RAN and target RAN, no IP connectivity between target RAN and source UPF), indicating whether indirect data forwarding tunnel is needed between the source UPF and target UPF) to the access & mobility management Function (AMF).

In one or more embodiments, a data forwarding tunnel establishment system may facilitate that when SMF receives the Create Indirect Data Forwarding Tunnel Request message from AMF, it will establish the indirect data forwarding tunnel between the source UPF and target UPF for the purpose of forwarding downlink data with no loss.

In one or more embodiments, a data forwarding tunnel establishment system may facilitate that when SMF was notified about the completion of handover, it will delete the indirect data forwarding tunnel between the source UPF and target UPF.

In one or more embodiments, a data forwarding tunnel establishment system may facilitate that the SMF may notify source RAN node to release the UE context.

In one or more embodiments, a data forwarding tunnel establishment system may facilitate that the SMF may delete the User Plane connection between the source RAN node and the source UPF.

In one or more embodiments, a data forwarding tunnel establishment system may include in the Handover Required message, source RAN node needs to inform AMF about the reason (e.g., no Xn interface between the source RAN and target RAN, no IP connectivity between target RAN and source UPF) for N2 based handover and indication of whether indirect data forwarding tunnel is needed between the source UPF and target UPF.

In one or more embodiments, by configuration, if the SMF knows the source RAN nodes cannot communicate with the target UPF, it will establish the temporary data forwarding tunnel between the source UPF and target UPF.

For edge computing cases, if the target UPF can serve the application function (AF), this tunnel can be released after data forwarding for a period of time; otherwise, the data forwarding tunnel will be maintained until the UE moves to a new target UPF which can serve the AF. The embodiments discussed herein may benefit the enabling of end to end edge computing solution in 5G systems by guaranteeing data integrity during UE mobility.

FIG. 1 depicts a diagram illustrating an N2 based handover with user plane function (UPF) relocation procedure, in accordance with one or more example embodiments of the present disclosure.

Referring to FIG. 1, there is shown a UE 102 involved in a handover from a Source RAN 104 to a Target RAN 106. Further, there is shown an AMF 108, an SMF 110, a Source UPF 112, a Target UPF 114, and a UPF session anchor (PSA) 116.

It should be noted that when edge computing is supported, the Source UPF 112 may be the source uplink classifier and the Target UPF 114 may be the target uplink classifier, the PDU session anchor (PSA) may be the local traffic offload anchor or local PDU session anchor. Uplink classifier, PSA and local traffic offload anchor are defined in current specifications.

The procedure of FIG. 1 may operate as follows:

The Source RAN 104 node may decide to initiate an N2-based handover to the Target RAN 106 node due to, for example, no Xn connectivity to the Target RAN 106 node or the Target RAN 106 has no IP connectivity with Source UPF 112 based on its configuration or Xn based handover preparation failure due to Target RAN 106 informing that there is no IP connectivity between Target RAN 106 and Source UPF 112. The Source RAN 104 node sends a Handover Required message 1. The handover required message 1 may comprise, at least in part, a Target ID, a Source to Target transparent container, a session management N2 information list including PDU session IDs, a reason for N2 based handover, an indication of whether indirect data forwarding tunnel is needed between the Source UPF 112 and Target UPF 114. The reason for N2 based handover may include, for example, no Xn interface between the Source RAN 104 and Target RAN 106, no IP connectivity between Target RAN 106 and Source UPF 112.

In one or more embodiments, the Source to Target transparent container may include RAN information created by the Source RAN 104 to be used by the Target RAN 106, and is transparent to 3GPP 5G core network (5GCN). The SM N2 info list may include information of all PDU sessions handled by the Source RAN 104 (e.g., all existing PDU sessions with active UP connections), indicating which of those PDU session(s) are requested by the Source RAN 104 to handover. The Source RAN 104 may also include which quality of service (QoS) flows are subject to data forwarding.

In one or more embodiments, the AMF 108 sends a PDU Handover request message 2 (PDU session ID, Target ID) to SMF 110.

In one embodiment, if the UE has moved out of the subscribed service area of the PDU session which leads to no IP connectivity between Target RAN 106 node and Source UPF 112, the SMF 110 should be notified and SMF 110 needs to reselect the serving UPF.

In one or more embodiments, the AMF 108 may need to send this message to SMF 110 for each PDU session whose serving UPF's service area cannot serve the UE's Target RAN 106 node. For those PDU sessions whose serving UPF's service area can still serve the UE's Target RAN 106 node, steps 2-5 are not needed.

In one or more embodiments, at optional block 3 and based on the new location information, the SMF 110 may check if N2 Handover for the indicated PDU session can be accepted. The SMF 110 checks also the UPF selection criteria. If UE has moved out of the service area of the UPF, SMF 110 reselects a UPF for this PDU session.

In one or more embodiments, the SMF 110 may send a N4 Session Establishment Request 4a to the selected Target UPF 114.

In one embodiment, if the SMF 110 selects a new intermediate UPF, Target UPF 114 (Target UPF 114), for the PDU session and if CN Tunnel Info is allocated by the Target UPF 114, an N4 Session Establishment Request message is sent to the Target UPF 114, providing Packet detection, enforcement and reporting rules to be installed on the Target UPF 114. The PDU session anchor tunnel info for this PDU Session is also provided to the Target UPF 114.

In one or more embodiments, the Target UPF 114 may respond with a N4 Session Establishment Response message 4b to the SMF 110.

In one embodiment, the Target UPF 114 may send an N4 Session Establishment Response message to the SMF 110 with client node (CN) downlink (DL) tunnel info and uplink (UL) Tunnel info (e.g., N3 tunnel info). The SMF 110 starts a timer, to be used in step 22a.

In one or more embodiments, the SMF 110 sends a PDU Handover Response (PDU session ID, SM N2 info) message 5 to the AMF 108. The SMF 110 includes the result in SM N2 info sent, transparently for the AMF 108, to the Target RAN 106. If N2 handover for the PDU session is accepted the SM N2 info also includes PDU session ID, N3 UP address and Tunnel ID of UPF, and QoS parameters.

One or more embodiments, at block 6 the AMF 108 supervises the PDU Handover Response messages from the involved SMFs 110. The lowest value of the Max delay indications for the PDU sessions that are candidates for handover gives the maximum time AMF 108 may wait for PDU Handover Response messages before continuing with the N2 Handover procedure. At expiry of the maximum wait time or when all PDU Handover Response messages are received, AMF 108 continues with the N2 Handover procedure (Handover Request message in step 8).

In one or more embodiments, the AMF 108 may send a Handover Request message 7 to Target RAN 106 node. The handover request message 7 may comprise a Source to Target transparent container, a mobility management (MM) N2 info, a session management (SM) N2 info list, or a reason for N2 based handover.

In one embodiment, the AMF 108 determines Target RAN 106 based on Target ID. The AMF 108 may allocate a globally unique temporary identifier (GUTI) valid for the UE in the AMF 108 and target tracking area identity (TAI).

In one embodiment, the source to Target transparent container is forwarded as received from Source RAN 104. MM N2 info includes e.g., security information and Handover Restriction List. The SM N2 info list may include SM N2 info from Source RAN 104.

In one or more embodiments, the Target RAN 106 may send a Handover Request Acknowledge Target RAN 106 message 8 to the AMF 108. The handover Request acknowledge message 8 may comprise at least in part a Target to Source transparent container, a SM N2 response list, a PDU sessions failed to be setup list, or a Target RAN 106 SM N3 forwarding info list.

The Target to Source transparent container may include a UE container with an access stratum part and a NAS part. The UE container is sent transparently via AMF 108 and Source RAN 104 to the UE.

In one embodiment, the information provided to the Source RAN 104 also contains a list of PDU session IDs indicating PDU sessions failed to be setup and reason for failure (Target RAN 106 decision). The SM N2 response list includes, per each received SM N2 info a PDU session ID and an indication if Target RAN 106 accepted the N2 Handover request for the PDU session. For each accepted PDU session for N2 Handover, the SM N2 response includes N3 UP address and Tunnel ID of Target RAN 106 for downlink traffic on N3 (one tunnel per PDU session). The Target RAN 106 SM N3 forwarding info list includes, per each PDU session accepted by Target RAN 106 and has at least one QoS flow subject for data forwarding, N3 UP address and Tunnel ID of Target RAN 106 for receiving forwarded data if necessary.

In one or more embodiments, the AMF 108 sends a PDU Handover Cancel (PDU session ID) message 9 to the SMF 110. When a PDU Handover Response message arriving too late (see step 6), or the PDU session with SMF 110 involvement in step 2 is not accepted by Target RAN 106, this message is indicated to the corresponding SMF 110 allowing the SMF 110 to deallocate a possibly allocated N3 UP address and Tunnel ID of the selected UPF. A PDU session handled by that SMF 110 is considered deactivated and handover attempt is terminated for that PDU session.

In one or more embodiments, the AMF 108 sends a Create Indirect Data Forwarding Tunnel Request message 10 to the SMF 110 in case direct data forwarding from Source RAN 104 node to Target RAN 106 node is not possible due to one or more issues. When receiving this message, the SMF 110 knows Xn based direct data forwarding between the Source RAN 104 node and Target RAN 106 node is unavailable and will create the indirect data forwarding tunnel between the Source UPF 112 and Target UPF 114. It should be noted that in case the Source UPF 112 has no connectivity to the Target RAN 106 and the Target UPF 114 cannot serve the AF, SMF 110 may decide to insert the Target UPF 114 (e.g., UL CL) between the Target RAN 106 and the Source UPF 112 (e.g., UL CL) in order for the locally offloaded data to be forwarded to the AF.

In one or more embodiments, the SMF 110 may send N4 Create Indirect Data Forwarding Tunnel Request message 11a, which may include a Source UPF 112's IP address and tunnel endpoint identification (TEID), for data forwarding, a UPF (PSA)'s IP address and TEID for N9 interface) to the Target UPF 114 to establishment the indirect data forwarding tunnel between the Source UPF 112 and Target UPF 114.

In one or more embodiments, the Target UPF 114 may respond to the SMF 110 with N4 Session Establishment Response message (e.g., message 4b) and Create Indirect Data Forwarding Tunnel Response message 11b.

In one or more embodiments, the SMF 110 sends a Create Indirect Data Forwarding Tunnel Request message 12a to Source UPF 112 including the source and Target UPF 114's User Plane IP address and TEID for data forwarding.

In one or more embodiments, the Source UPF responds to SMF 110 with Create Indirect Data Forwarding Tunnel Response message 12b.

In one or more embodiments, the SMF 110 responds to AMF 108 with Create Indirect Data Forwarding Tunnel Response message 13.

In one or more embodiments, the AMF 108 sends a Handover Command (Target to Source transparent container, SM forwarding info list) message 14 to the Source RAN 104 node. The Target to Source transparent container is forwarded as received from AMF 108. The SM forwarding info list includes Target RAN 106 SM N3 forwarding info list for direct forwarding or Target UPF 114 SM N3 forwarding info list for indirect data forwarding.

In one or more embodiments, the Source RAN 104 node sends a Handover Command (UE container) message 15 to UE. UE container is sent transparently from Target RAN 106 via AMF 108 to Source RAN 104 and is provided to the UE by the Source RAN 104.

In one or more embodiments, the downlink data is forwarded (e.g., directly using a direct downlink data forwarding message 16a or indirect downlink data forwarding message 16b) from the Source RAN 104 node to the Target RAN 106 node via Source UPF 112 and Target UPF 114 after this step.

In one or more embodiments, the UE sends a Handover Confirm message 17 to Target RAN 106 node. After the UE has successfully synchronized to the target cell, it sends a Handover Confirm message to the Target RAN 106. Handover is by this message considered as successful by the UE. It should be noted that the uplink data is sent from the Target RAN 106 to the Target UPF 114 and the UPF (PSA).

In one or more embodiments, the Target RAN 106 node sends a Handover Notify message 18 to the AMF 108.

In one or more embodiments, the AMF 108 sends a Handover Complete Notification message 19 to the SMF 110.

In one or more embodiments, the SMF 110 sends a N4 Session Modification Request message 20a to UPF (PSA) including the Target UPF 114's IP address and Tunnel Endpoint ID (TEID). UPF (PSA) will route the downlink data to Target UPF 114. It should be noted that downlink data is sent via Target UPF 114 to Target RAN 106 node after this step.

In one or more embodiments, the UPF (PSA) responds to the SMF 110 with a N4 Session Modification Response message 20b.

In one or more embodiments, the SMF 110 sends a N4 Session Modification Request message 21a to Target UPF 114 including Target RAN 106 node's user plane IP address and TEID for N3 interface.

In one or more embodiments, the Target UPF 114 responds to SMF 110 with a N4 Session Modification Response message 21b.

In one or more embodiments, in case the Source UPF 112 is not changed, the SMF 110 needs to send a N4 Session Modification Request message 22a to the Source UPF 112 including the Target RAN 106 node's user plane IP address and the TEID for N3 interface. The source UPF 112 responds with an N4 session modification response message 22b.

In one or more embodiments, the SMF 110 responds with a Handover Complete Acknowledge message 23 to the AMF 108.

In one or more embodiments, in case some PDU sessions were not active and need to be activated due to handover, the SMF 110 needs to update those UPFs with the Target RAN 106 node's user plane IP address and the TEID for N3 interface (e.g., messages 24a and 24b). It should be noted that downlink data goes through UPF (PSA), Target UPF 114, Target RAN 106 to UE.

In one or more embodiments, the SMF 110 deletes the indirect data forwarding tunnel to the Target UPF 114. This may be accomplished by sending a N4 Delete Indirect Data Forwarding Tunnel Request message 25a from the SMF 110 to the Target UPF 114. The Target UPF 114 may respond by sending a N4 Delete Indirect Data Forwarding Tunnel Response message 25b.

In one or more embodiments, the SMF 110 deletes the indirect data forwarding tunnel to the Source UPF 112. This may be accomplished by sending a Delete Indirect Data Forwarding Tunnel Request message 26a from the SMF 110 to the Source UPF 112. The Source UPF 112 may respond by sending a N4 Delete Indirect Data Forwarding Tunnel Response message 26b.

In one or more embodiments, the AMF 108 sends a UE Context Release Request message 27a to Source RAN 104 node. Source RAN 104 node will release the UE's context and responds to the AMF 108 (e.g., message 27b).

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular, 3GPP NR (New Radio) by allocating the OFDM carrier data bit vectors to the corresponding symbol resources.

Figure 2:
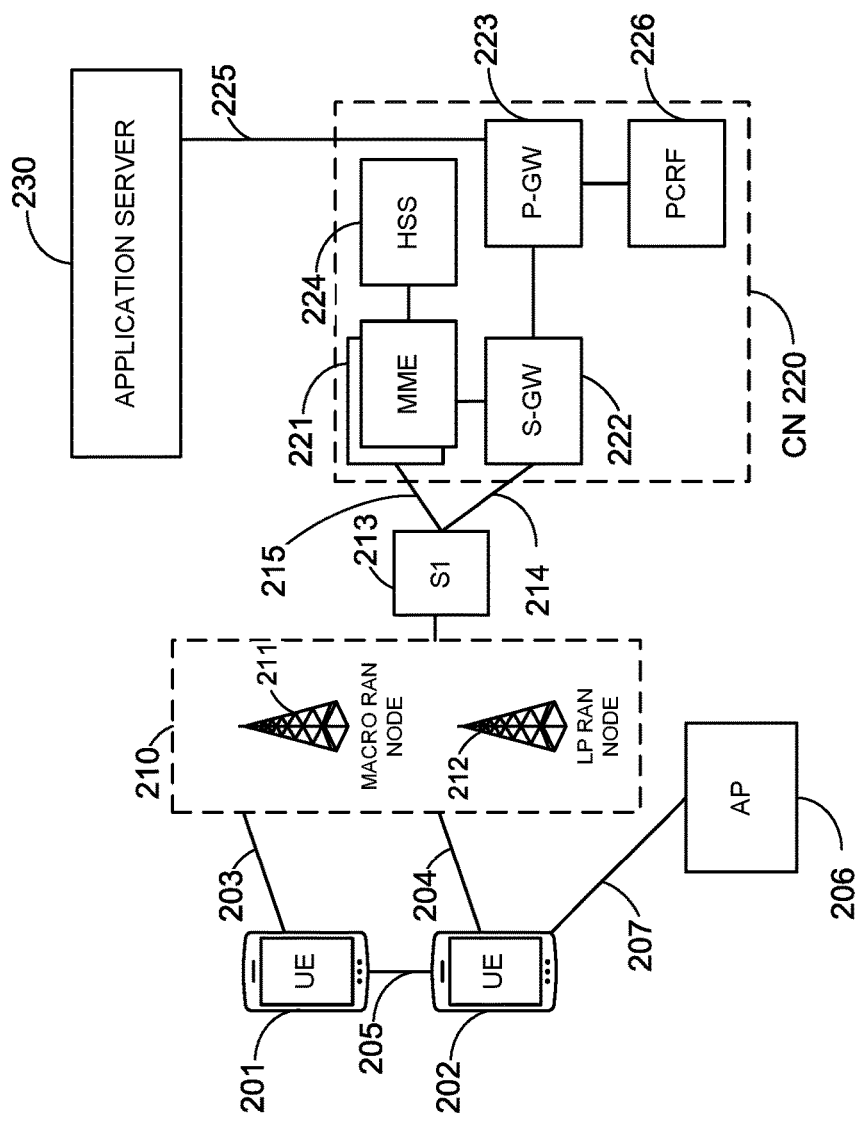
FIG. 2 depicts an architecture of a system, in accordance with one or more example embodiments of the present disclosure.

FIG. 2 illustrates an architecture of a system 200 of a network, in accordance with one or more example embodiments of the present disclosure.

The system 200 is shown to include a user equipment (UE) 201 and a UE 202. The UEs 201 and 202 are illustrated as smartphones (e.g., handheld touchscreen mobile computing devices connectable to one or more cellular networks), but may also comprise any mobile or non-mobile computing device, such as personal data assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), a Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210. The RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections 203 and 204, respectively, each of which comprises a physical communications interface or layer (discussed in further detail below); in this example, the connections 203 and 204 are illustrated as air interfaces to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 202 is shown to be configured to access an access point (AP) 206 via a connection 207. The connection 207 can comprise a local wireless connection, such as a connection consistent with any institute of electrical and electronics engineers (IEEE) 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance with various communication techniques, such as, but not limited to, an Orthogonal Frequency-Division Multiple Access (OFDMA) communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that can be allocated currently. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (hybrid automatic repeat request) information related to the uplink shared channel Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four quadrature phase shift keying (QPSK) symbols may be mapped to each REG. The PDCCH can be transmitted using one or more CCEs, depending on the size of the downlink control information (DCI) and the channel condition. There can be four or more different PDCCH formats defined in the LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 210 is shown to be communicatively coupled to a core network (CN) 220 via an S1 interface 213. In some embodiments, the CN 220 may be an evolved packet core (EPC) network, a NextGen Packet Core (NPC) network, or some other type of CN. In this embodiment, the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and the MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of the legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and may route data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network and external networks such as a network including the application server 230 (alternatively referred to as an application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and charging enforcement function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate quality of service (QoS) and charging parameters. The PCRF 226 may provision this rule into a policy and charging enforcement function (PCEF) (not shown) with the appropriate traffic flow template (TFT) and QoS class of identifier (QCI), which commences the QoS and charging as specified by the application server 230.

Figure 3:
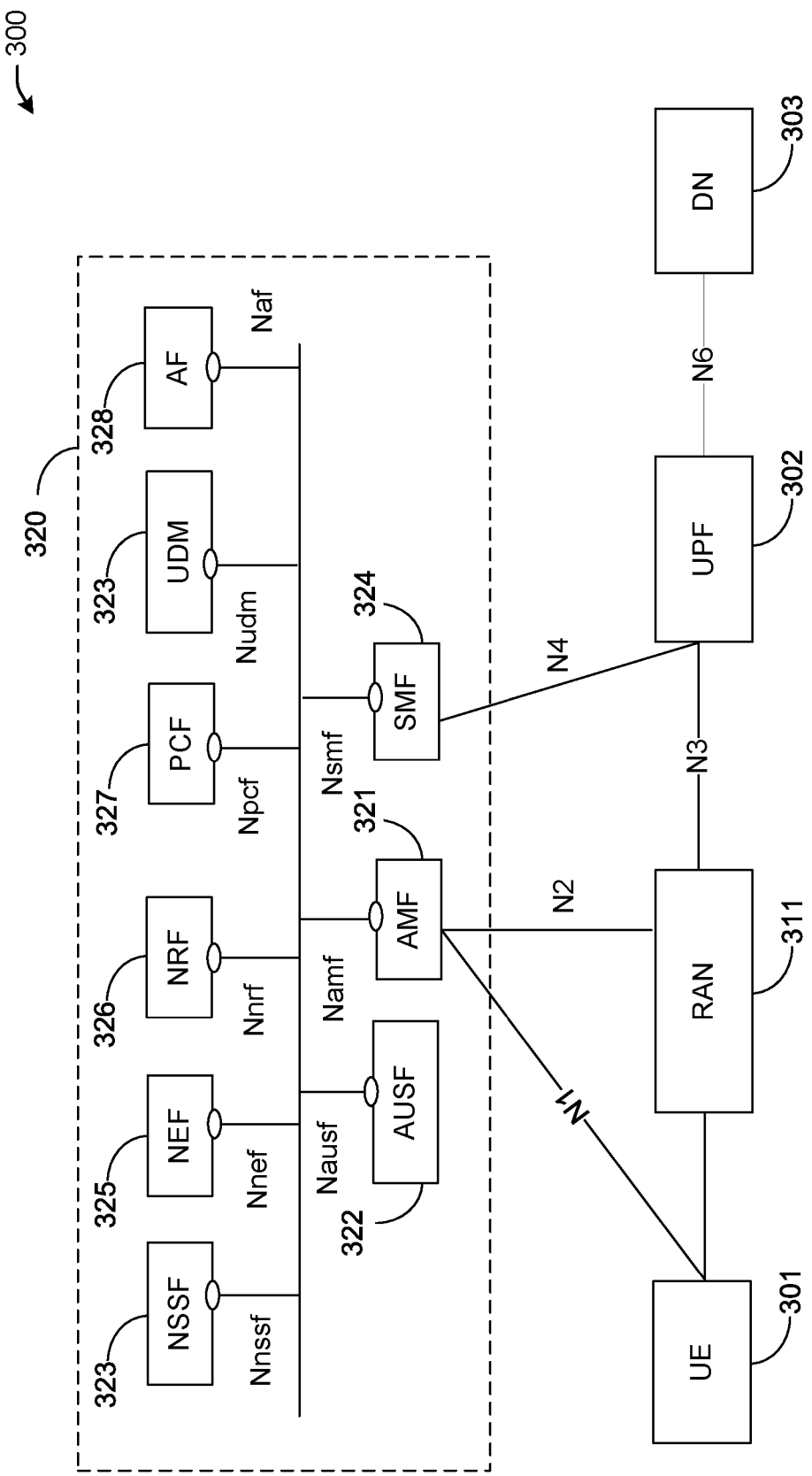
FIG. 3 depicts an architecture of a system, in accordance with one or more example embodiments of the present disclosure.

FIG. 3 illustrates an architecture of a system 300 of a network in accordance with some embodiments.

The system 300 is shown to include a UE 301, which may be the same or similar to UEs 201 and 202 discussed previously; a RAN node 311, which may be the same or similar to RAN nodes 211 and 212 discussed previously; a User Plane Function (UPF) 302; a Data network (DN) 303, which may be, for example, operator services, Internet access or 3rd party services; and a 5G Core Network (5GC or CN) 320.

The CN 320 may include an Authentication Server Function (AUSF) 322; an network slice selection function (NSSF) 323; a Core Access and Mobility Management Function (AMF) 321; a Session Management Function (SMF) 324; a Network Exposure Function (NEF) 323; a Policy Control function (PCF) 327; a Network Function (NF) Repository Function (NRF) 326; a Unified Data Management (UDM) 323; and an Application Function (AF) 328. The CN 320 may also include other elements that are not shown, such as a Structured Data Storage network function (SDSF), an Unstructured Data Storage network function (UDSF), and the like.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 302 may include an uplink classifier to support routing traffic flows to a data network. The DN 303 may represent various network operator services, Internet access, or third party services. DN 303 may include, or be similar to application server 230 discussed previously.

The AUSF 322 may store data for authentication of UE 301 and handle authentication related functionality. Facilitates a common authentication framework for various access types.

The AMF 321 may be responsible for registration management (e.g., for registering UE 301, etc.), connection management, reachability management, mobility management, and lawful interception of AMF-related events, and access authentication and authorization. AMF 321 may provide transport for SM messages with SMF 324, and act as a transparent proxy for routing SM messages. AMF 321 may also provide transport for short message service (SMS) messages between UE 301 and an SMS function (SMSF) (not shown by FIG. 3). AMF 321 may act as Security Anchor Function (SEA), which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a Security Context Management (SCM) function, which receives a key from the SEA that it uses to derive access-network specific keys. Furthermore, AMF 321 may be associated with a RAN via an interface. The AMF 321 may be a termination point of RAN CP interface (N2 reference point), a termination point of NAS (N1) signalling, and perform NAS ciphering and integrity protection.

AMF 321 may also support NAS signalling with a UE 301 over an N3 interworking-function (IWF) interface. The N3IWF may be used to provide access to untrusted entities. N33IWF may be a termination point for the N2 and N3 interfaces for control plane (CP) and user plane (CP), respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 301 and AMF 321, and relay uplink and downlink user-plane packets between the UE 301 and UPF 302. The N3IWF also provides mechanisms for IPsec tunnel establishment with the UE 301.

The SMF 324 may be responsible for session management (e.g., session establishment, modify and release, including tunnel maintain between UPF and RAN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 324 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signalling for PDU session authorization/authentication by external DN.

The NEF 325 may provide means for securely exposing the services and capabilities provided by 3GPP network functions for third party, internal exposure/re-exposure, Application Functions (e.g., AF 328), edge computing or fog computing systems, etc. In such embodiments, the NEF 325 may authenticate, authorize, and/or throttle the AFs. NEF 325 may also translate information exchanged with the AF 328 and information exchanged with internal network functions. For example, the NEF 325 may translate between an AF-Service-Identifier and an internal 5GC information. NEF 325 may also receive information from other network functions (NFs) based on exposed capabilities of other network functions. This information may be stored at the NEF 325 as structured data, or at a data storage NF using a standardized interfaces. The stored information can then be re-exposed by the NEF 325 to other NFs and AFs, and/or used for other purposes such as analytics.

The NRF 326 may support service discovery functions, receive NF Discovery Requests from NF instances, and provide the information of the discovered NF instances to the NF instances. NRF 326 also maintains information of available NF instances and their supported services.

The PCF 327 may provide policy rules to control plane function(s) to enforce them, and may also support unified policy framework to govern network behaviour. The PCF 327 may also implement a front end (FE) to access subscription information relevant for policy decisions in a UDR of UDM 323.

The UDM 323 may handle subscription-related information to support the network entities' handling of communication sessions, and may store subscription data of UE 301. The UDM 323 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 327. UDM 323 may also support SMS management, wherein an SMS-FE implements the similar application logic as discussed previously.

The AF 328 may provide application influence on traffic routing, access to the Network Capability Exposure (NCE), and interact with the policy framework for policy control. The NCE may be a mechanism that allows the 5GC and AF 328 to provide information to each other via NEF 325, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 323 for notification procedure that the UE 301 is available for SMS transfer (e.g., set a UE not reachable flag, and notifying UDM 323 when UE 301 is available for SMS).

The system 300 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 300 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 320 may include an Nx interface, which is an inter-CN interface between the MME (e.g., MME 221) and the AMF 321 in order to enable interworking between CN 320 and CN 220.

Although not shown by FIG. 3, system 300 may include multiple RAN nodes 311 wherein an Xn interface is defined between two or more RAN nodes 311 (e.g., gNBs and the like) that connecting to 5GC 320, between a RAN node 311 (e.g., gNB) connecting to 5GC 320 and an eNB (e.g., a RAN node 211 of FIG. 2), and/or between two eNBs connecting to 5GC 320.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 301 in a connected mode (e.g., CM-CONNECTED) including functionality to manage the UE mobility for connected mode between one or more RAN nodes 311. The mobility support may include context transfer from an old (source) serving RAN node 311 to new (target) serving RAN node 311; and control of user plane tunnels between old (source) serving RAN node 311 to new (target) serving RAN node 311.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 4:
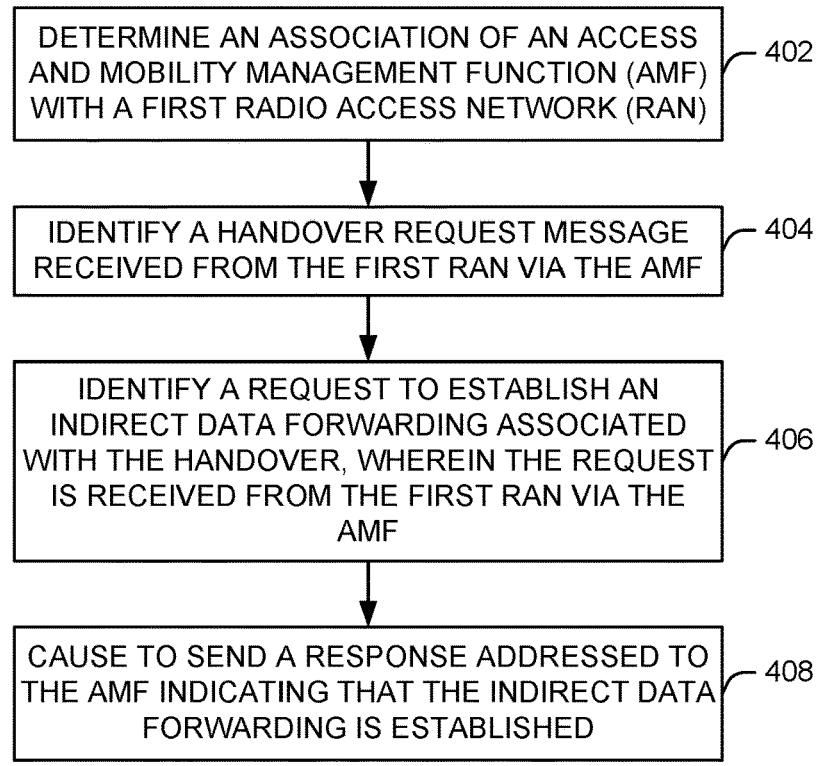
FIG. 4 illustrates a flow diagram of an illustrative process for a data forwarding tunnel establishment system, in accordance with one or more example embodiments of the present disclosure.

FIG. 4 illustrates a flow diagram of illustrative process 400 for a data forwarding tunnel establishment system, in accordance with one or more example embodiments of the present disclosure.

At block 402, a device (e.g., the SMF of FIG. 1) may determine an association of an access and mobility management function (AMF) with a first radio access network (RAN). For example, an AMF may be responsible for registration management (e.g., for registering UE, etc.), connection management, reachability management, mobility management, and lawful interception of AMF-related events, and access authentication and authorization. AMF may provide transport for SM messages between and SMF, and act as a transparent proxy for routing SM messages. AMF may also provide transport for short message service (SMS) messages between UE 301 and an SMS function (SMSF). AMF may act as Security Anchor Function (SEA), which may include interaction with the AUSF and the UE, receipt of an intermediate key that was established as a result of the UE authentication process. Where USIM based authentication is used, the AMF may retrieve the security material from the AUSF. The AMF may also include a Security Context Management (SCM) function, which receives a key from the SEA that it uses to derive access-network specific keys. Furthermore, the AMF may be associated with a RAN via an interface. The AMF may be a termination point of RAN CP interface (N2 reference point), a termination point of NAS (N1) signalling, and perform NAS ciphering and integrity protection.

At block 404, the device may identify a handover request message received from the first RAN via the AMF (e.g., the AMF of FIG. 1). For example, an SMF may determine that a source RAN need to determine when an indirect forwarding is needed between the source UPF and target UPF. The source RAN node may decide to initiate an N2-based handover to the target RAN node due to, for example, no Xn connectivity to the target RAN node or the target RAN has no IP connectivity with source UPF based on its configuration or Xn based handover preparation failure due to target RAN informing that there is no IP connectivity between target RAN and source UPF. The source RAN node sends a Handover Required message (Target ID, Source to Target transparent container, SM N2 info list including PDU session IDs, reason for N2 based handover (e.g., no Xn interface between the source RAN and target RAN, no IP connectivity between target RAN and source UPF), indication of whether indirect data forwarding tunnel is needed between the source UPF and target UPF) to the access & mobility management Function (AMF).

At block 406, the device may identify a request to establish an indirect data forwarding associated with the handover, wherein the request is received from the first RAN via the AMF. For example, when an SMF receives the create indirect data forwarding tunnel request message from AMF, it will establish the indirect data forwarding tunnel between the source UPF and target UPF for the purpose of forwarding downlink data with no loss.

At block 408, the device may to send a response addressed to the AMF indicating that the indirect data forwarding is established. For example, a target UPF may respond to the SMF 110 with N4 Session Establishment Response message and create indirect data forwarding tunnel response message. The SMF 110 sends a create indirect data forwarding tunnel request message to Source UPF including the source and target UPF's user plane IP address and TEID for data forwarding. The Source UPF responds to SMF with create indirect data forwarding tunnel response message. The SMF responds to AMF with create indirect data forwarding tunnel response message.

It is understood that the above descriptions are for purposes of illustration and are not meant to be limiting.

Figure 5:
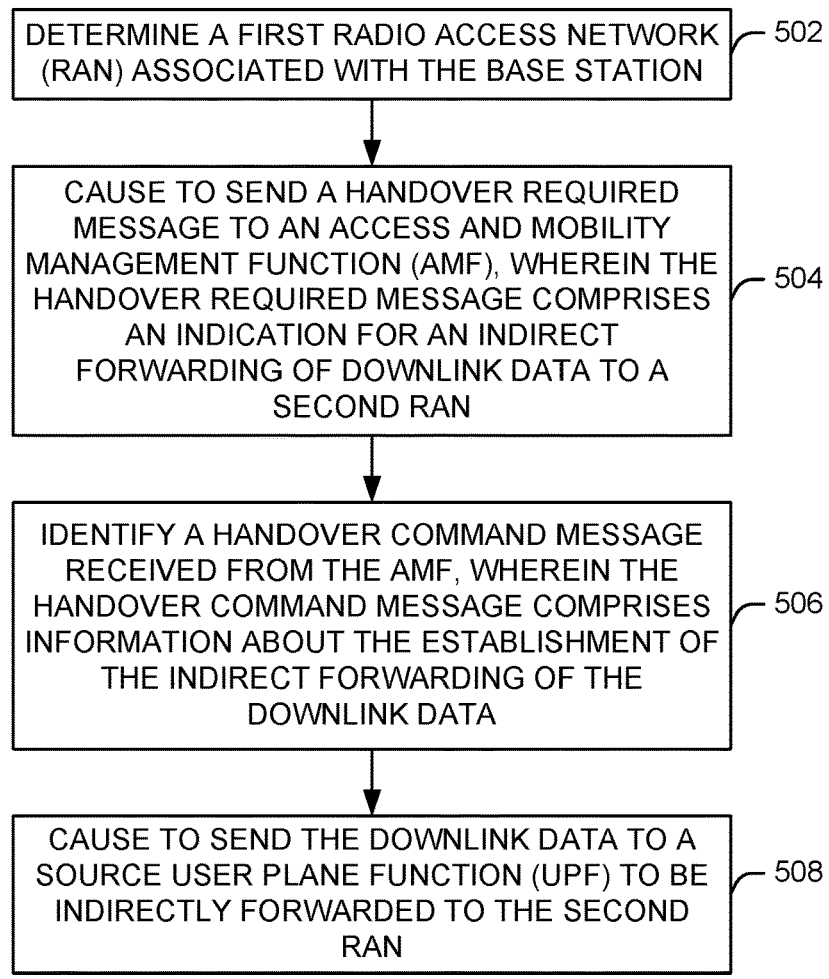
FIG. 5 illustrates a flow diagram of an illustrative process for a data forwarding tunnel establishment system, in accordance with one or more example embodiments of the present disclosure.

FIG. 5 illustrates a flow diagram of illustrative process 500 for a data forwarding tunnel establishment system, in accordance with one or more example embodiments of the present disclosure.

At block 502, a device (e.g., an eNodeB base station) may determine an association with a first radio access network (RAN) (e.g., a source RAN involved in handover procedure). For example, an AMF may be responsible for registration management (e.g., for registering UE, etc.), connection management, reachability management, mobility management, and lawful interception of AMF-related events, and access authentication and authorization. AMF may provide transport for SM messages between and SMF, and act as a transparent proxy for routing SM messages. AMF may also provide transport for short message service (SMS) messages between UE 301 and an SMS function (SMSF). AMF may act as Security Anchor Function (SEA), which may include interaction with the AUSF and the UE, receipt of an intermediate key that was established as a result of the UE authentication process. Where USIM based authentication is used, the AMF may retrieve the security material from the AUSF. The AMF may also include a Security Context Management (SCM) function, which receives a key from the SEA that it uses to derive access-network specific keys. Furthermore, the AMF may be associated with a RAN via an interface. The AMF may be a termination point of RAN CP interface (N2 reference point), a termination point of NAS (N1) signalling, and perform NAS ciphering and integrity protection.

At block 504, the device may cause to send a handover required message to an access and mobility management function (AMF), wherein the handover required message comprises an indication for an indirect forwarding of downlink data to a second RAN. For example, the eNodeB may determine that a source RAN need to determine when an indirect forwarding is needed between the source UPF and target UPF. The source RAN node may decide to initiate an N2-based handover to the target RAN node due to, for example, no Xn connectivity to the target RAN node or the target RAN has no IP connectivity with source UPF based on its configuration or Xn based handover preparation failure due to target RAN informing that there is no IP connectivity between target RAN and source UPF. The source RAN node sends a Handover Required message (Target ID, Source to Target transparent container, SM N2 info list including PDU session IDs, reason for N2 based handover (e.g., no Xn interface between the source RAN and target RAN, no IP connectivity between target RAN and source UPF), indication of whether indirect data forwarding tunnel is needed between the source UPF and target UPF) to the access & mobility management Function (AMF).

At block 506, the device may identify a handover command message received from the AMF, wherein the handover command message comprises information about the establishment of the indirect forwarding of the downlink data. For example, when an SMF receives the create indirect data forwarding tunnel request message from AMF, it will establish the indirect data forwarding tunnel between the source UPF and target UPF for the purpose of forwarding downlink data with no loss. The AMF sends a Handover Command (Target to Source transparent container, SM forwarding info list) message to the Source RAN node. The Target to Source transparent container is forwarded as received from AMF. The SM forwarding info list includes Target RAN SM N3 forwarding info list for direct forwarding or Target UPF SM N3 forwarding info list for indirect data forwarding.

At block 508 the device may cause to send a response addressed to the AMF indicating that the indirect data forwarding is established. For example, an AMF may be responsible for registration management (e.g., for registering UE, etc.), connection management, reachability management, mobility management, and lawful interception of AMF-related events, and access authentication and authorization. AMF may provide transport for SM messages between and SMF, and act as a transparent proxy for routing SM messages. AMF may also provide transport for short message service (SMS) messages between UE 301 and an SMS function (SMSF). AMF may act as Security Anchor Function (SEA), which may include interaction with the AUSF and the UE, receipt of an intermediate key that was established as a result of the UE authentication process. Where USIM based authentication is used, the AMF may retrieve the security material from the AUSF. The AMF may also include a Security Context Management (SCM) function, which receives a key from the SEA that it uses to derive access-network specific keys. Furthermore, the AMF may be associated with a RAN via an interface. The AMF may be a termination point of RAN CP interface (N2 reference point), a termination point of NAS (N1) signalling, and perform NAS ciphering and integrity protection.

It is understood that the above descriptions are for purposes of illustration and are not meant to be limiting.

Figure 6:
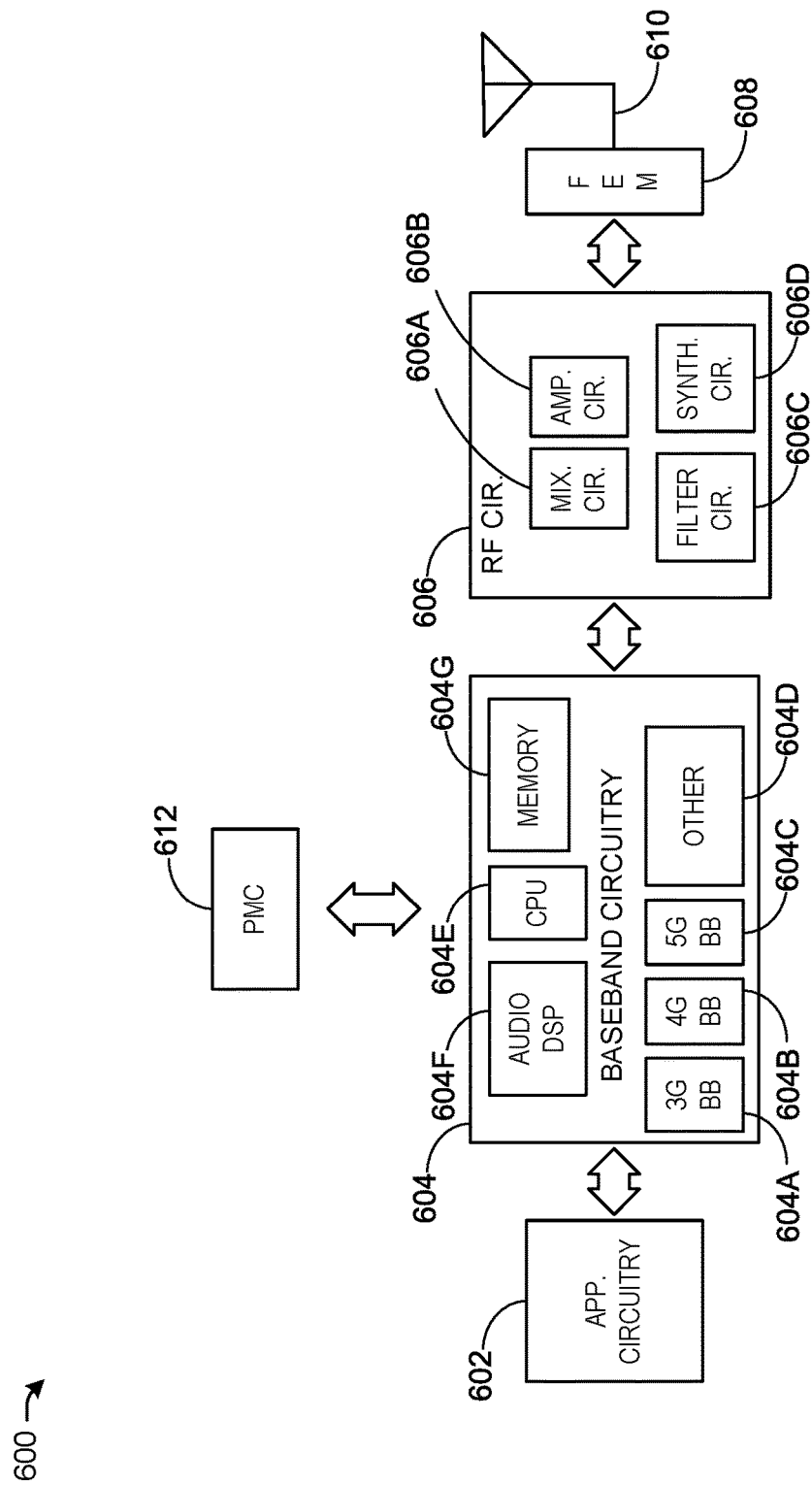
FIG. 6 illustrates example components of a device, in accordance with one or more example embodiments of the present disclosure.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), si6h generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), preceding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
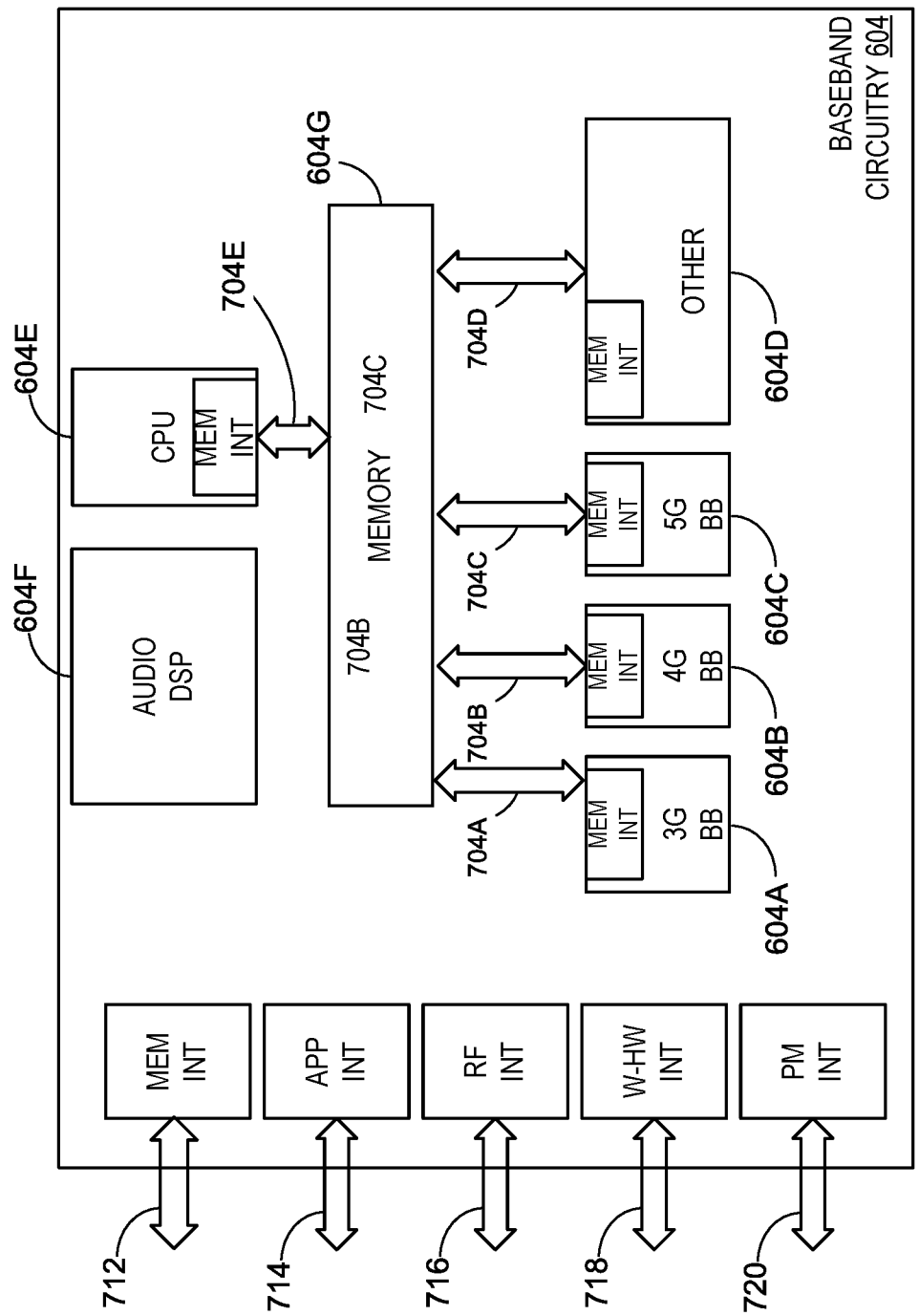
FIG. 7 illustrates example interfaces of baseband circuitry, in accordance with one or more example embodiments of the present disclosure.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
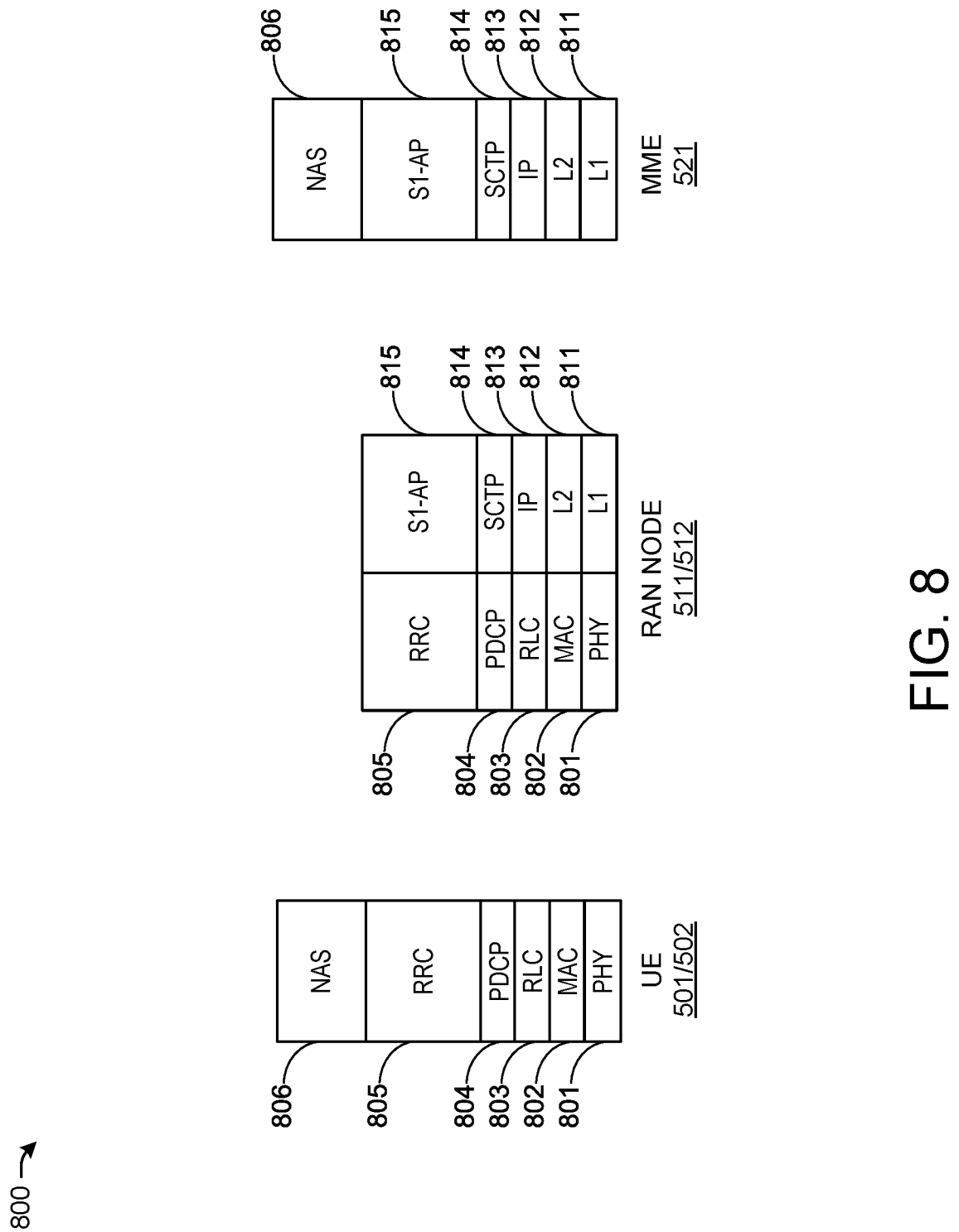
FIG. 8 is an illustration of a control plane protocol stack, in accordance with one or more example embodiments of the present disclosure.

FIG. 8 is an illustration of a control plane protocol stack in accordance with some embodiments. In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523 of FIG. 5.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
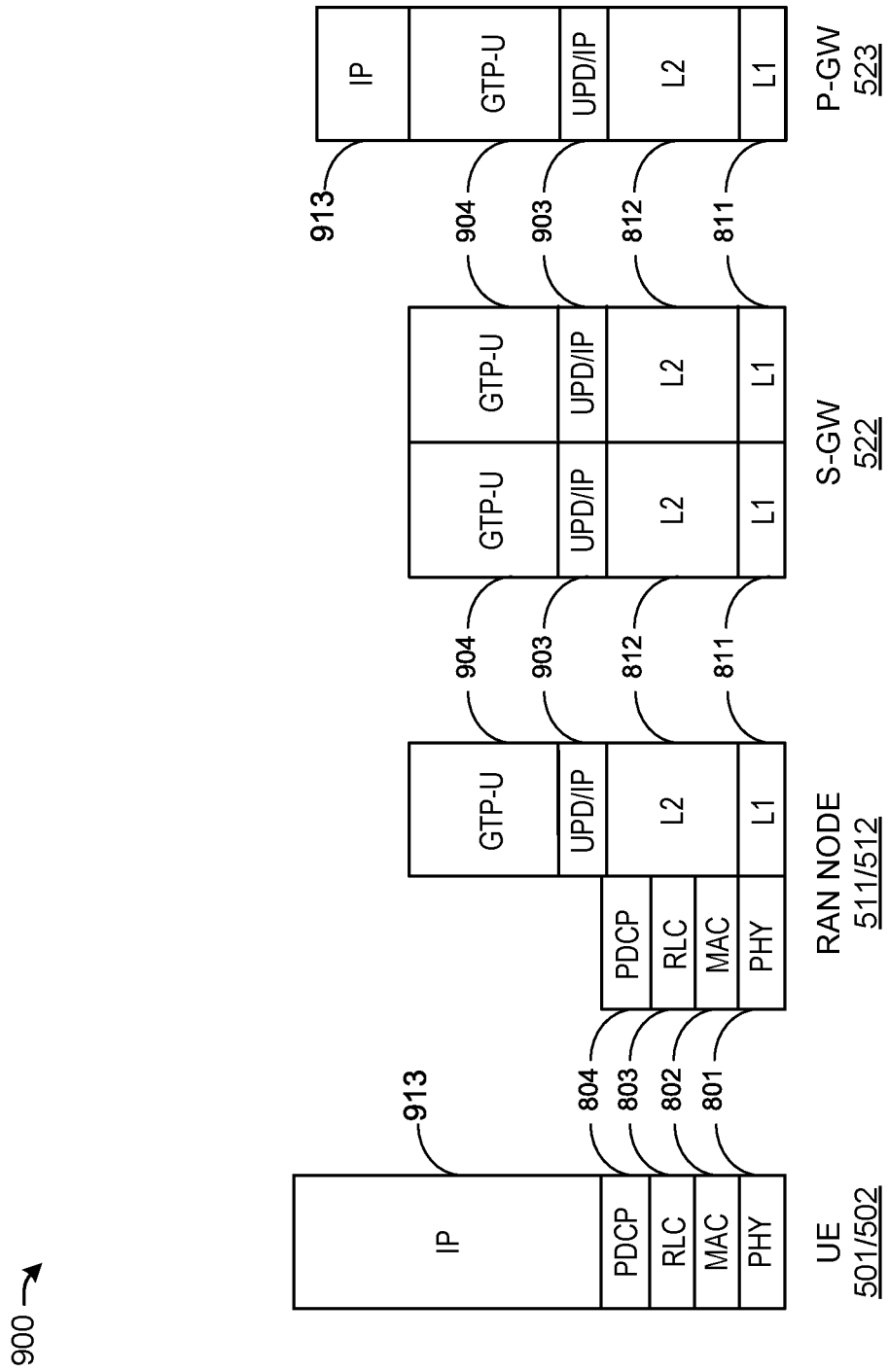
FIG. 9 is an illustration of a user plane protocol stack, in accordance with one or more example embodiments of the present disclosure.

FIG. 9 is an illustration of a user plane protocol stack in accordance with some embodiments. In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 903 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L2 layer 812, the UDP/IP layer 903, and the GTP-U layer 904. The S-GW 522 and the P-GW 523 may utilize an S5/S8a interface to exchange user plane data via a protocol stack comprising the L1 layer 811, the L2 layer 812, the UDP/IP layer 903, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
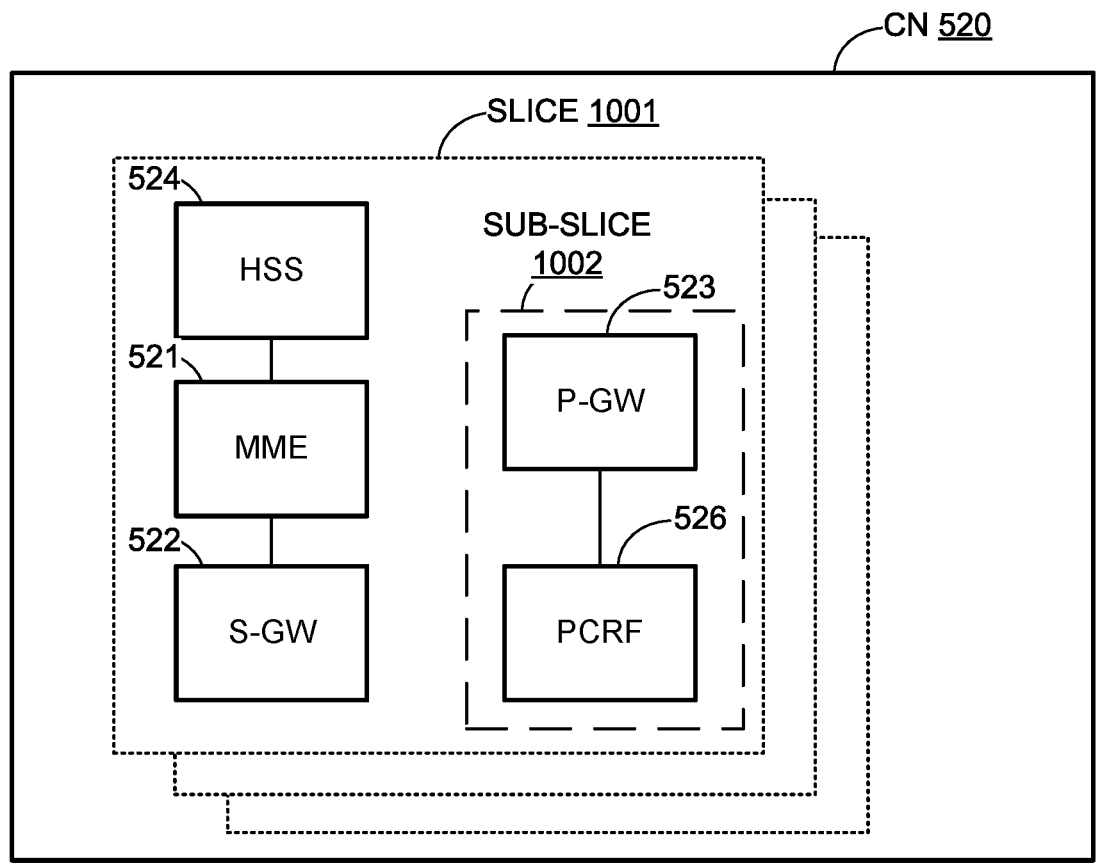
FIG. 10 illustrates components of a core network, in accordance with one or more example embodiments of the present disclosure.

FIG. 10 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. The network slice 1001 may include an HSS 524, an MME 521, an S-GW 522, in addition to a network sub-slice 1002. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
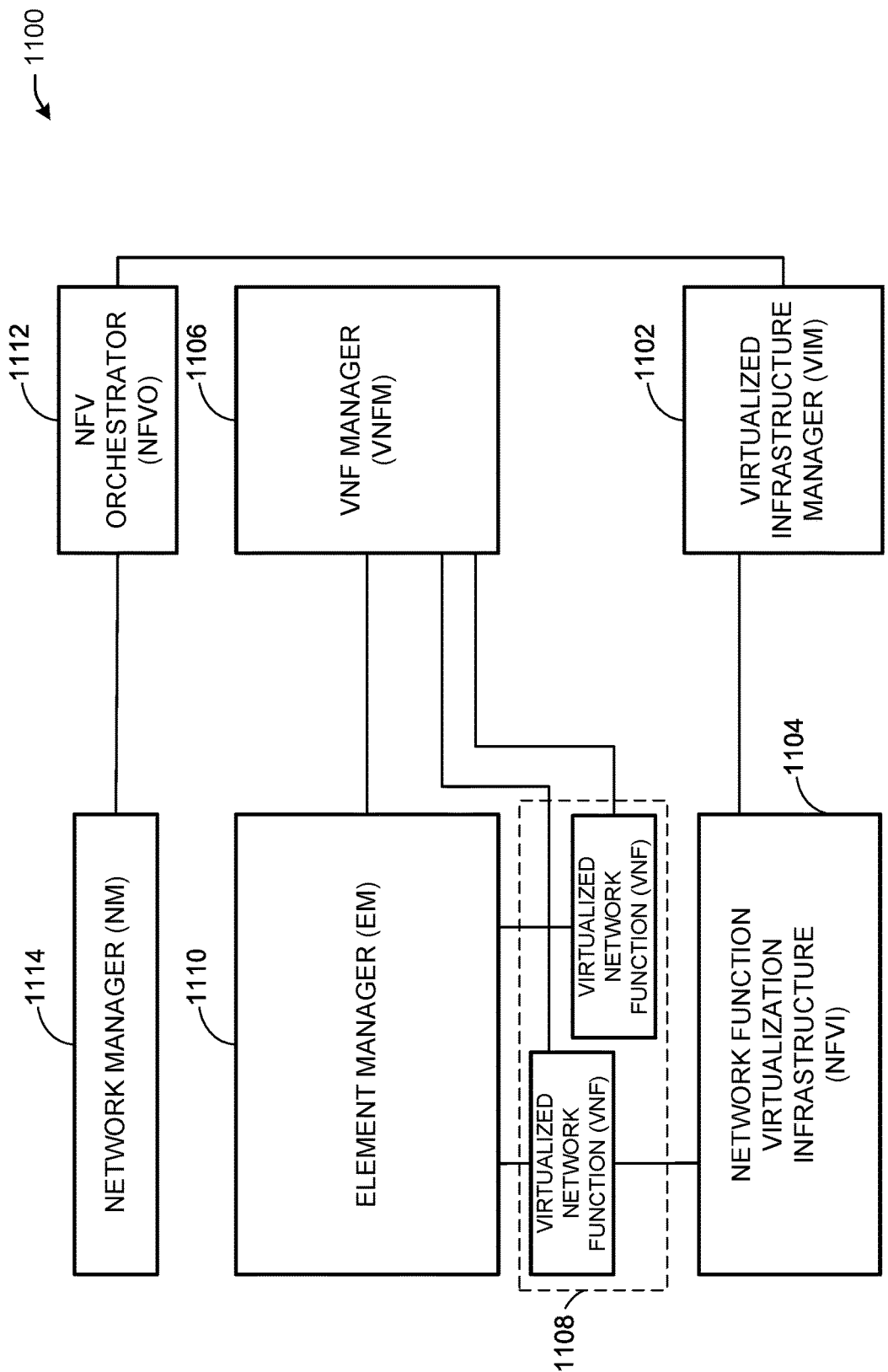
FIG. 11 is a block diagram illustrating components of a system to support network function virtualization (NFV), in accordance with one or more example embodiments of the present disclosure.

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
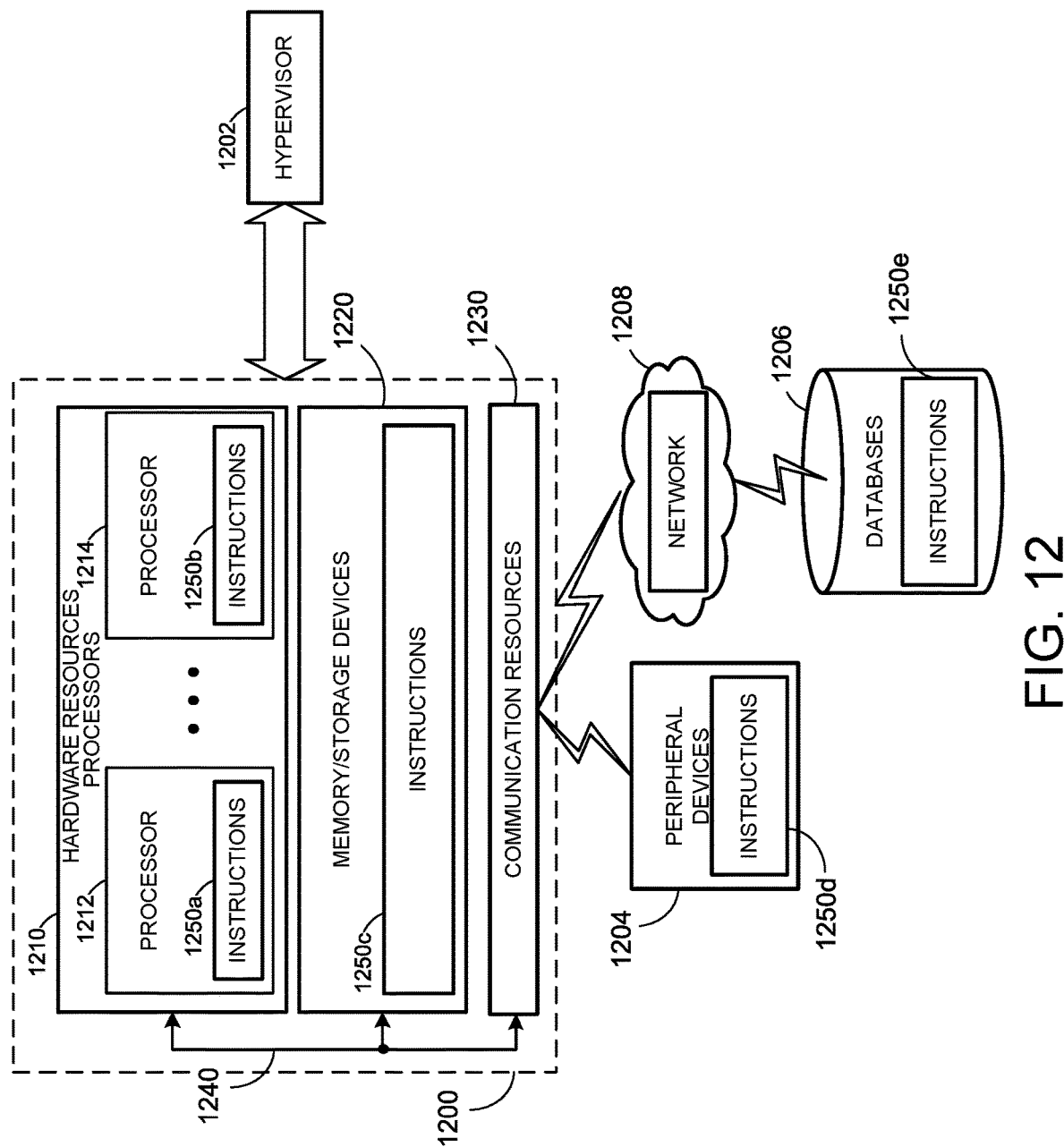
FIG. 12 is a block diagram illustrating one or more components, in accordance with one or more example embodiments of the present disclosure.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In some embodiments, the electronic device(s), network(s), system(s), chip(s) or component(s), or portions or implementations thereof, of Figures herein may be configured to perform one or more processes, techniques, or methods as described herein, or portions thereof.

The following examples pertain to further embodiments.

Example 1 may include when SMF receives the Create Indirect Data Forwarding Tunnel Request message from AMF, it will establish the indirect data forwarding tunnel between the source UPF and target UPF for the purpose of forwarding downlink data losslessly.

Example 2 may include when SMF was notified about the completion of handover, it will delete the indirect data forwarding tunnel between the source UPF and target UPF.

Example 3 may include in parallel with example No. 2 or some other example herein, wherein the SMF will notify source RAN node to release the UE context.

Example 4 may include in parallel with example No. 2 and 3 or some other example herein, wherein the SMF will delete the User Plane connection between the source RAN node and the source UPF.

Example 5 may include in the Handover Required message, source RAN node needs to inform AMF about the reason (e.g., no Xn interface between the source RAN and target RAN, no IP connectivity between target RAN and source UPF) for N2 based handover and indication of whether indirect data forwarding tunnel is needed between the source UPF and target UPF.

Example 6 may include an apparatus comprising means to perform one or more elements of a method described in or related to any of examples 1-5, or any other method or process described herein.

Example 7 may include one or more non-transitory computer-readable media comprising instructions to cause an electronic device, upon execution of the instructions by one or more processors of the electronic device, to perform one or more elements of a method described in or related to any of examples 1-5, or any other method or process described herein.

Example 8 may include an apparatus comprising logic, modules, or circuitry to perform one or more elements of a method described in or related to any of examples 1-5, or any other method or process described herein.

Example 9 may include a method, technique, or process as described in or related to any of examples 1-5, or portions or parts thereof.

Example 10 may include an apparatus comprising: one or more processors and one or more computer readable media comprising instructions that, when executed by the one or more processors, cause the one or more processors to perform the method, techniques, or process as described in or related to any of examples 1-5, or portions thereof.

Example 11 may include a signal as described in or related to any of examples 1-5, or portions or parts thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

The following examples pertain to additional embodiments.

Example 16 may include a device comprising storage and processing circuitry configured to: determine an association of an access and mobility management function (AMF) with a first radio access network (RAN); identify a handover request message received from the first RAN via the AMF; identify a request to establish an indirect data forwarding associated with the handover, wherein the request may be received from the first RAN via the AMF; and cause to send a response addressed to the AMF indicating that the indirect data forwarding may be established.

Example 17 may include the device of example 16 and/or some other example herein, wherein the device may be a session management function (SMF), wherein the SMF may be communicatively coupled to at least one of a first user plane function (UPF) and a second UPF, the first UPF and the second UPF are associated with the handover.

Example 18 may include the device of example 16 and/or some other example herein, wherein the handover request message may include a protocol data unit (PDU) session ID and a target ID wherein the target ID may be associated with a target RAN.

Example 19 may include the device of example 16 and/or some other example herein, wherein the processing circuitry may be further configured to: cause to send a create indirect data forwarding tunnel request message to a source UPF; and identify a create indirect data forwarding tunnel response from the source UPF.

Example 20 may include the device of example 16 and/or some other example herein, wherein the processing circuitry may be further configured to: identify a handover complete notification received from the AMF; and cause to send a handover complete acknowledgment addressed to the AMF.

Example 21 may include the device of example 16 and/or some other example herein, wherein the processing circuitry may be further configured to cause to send a modification request message to a PDU session anchor (PSA), wherein the modification request message may include a target user plane function (UPF) internet protocol (IP) address and a tunnel endpoint identification (TEID), the TEID being associated with the indirect data forwarding.

Example 22 may include the device of example 21 and/or some other example herein, wherein the first RAN may be a source RAN associated with the handover, and wherein the processing circuitry may be further configured to determine a target RAN associated with the handover.

Example 23 may include the device of example 22 and/or some other example herein, wherein the processing circuitry may be further configured to determine a source UPF associated with the source RAN and the target UPF associated with the target RAN.

Example 24 may include the device of example 21 and/or some other example herein, wherein the processing circuitry may be further configured to: cause to send a create an indirect data forwarding tunnel request message on a first interface to the target UPF; and identify a session establishment response message received from the target UPF.

Example 25 may include the device of example 24 and/or some other example herein, wherein the processing circuitry may be further configured to delete the indirect data forwarding tunnel to the target UPF.

Example 26 may include a non-transitory computer-readable medium storing computer-executable instructions which when executed by one or more processors result in performing operations comprising: determine an association with a first radio access network (RAN); cause to send a handover request message to a session management function (SMF); cause to send a request to establish an indirect data forwarding associated with the handover, wherein the request may be sent to the SMF; and identify a response received from the SMF indicating that the indirect data forwarding may be established.

Example 27 may include the non-transitory computer-readable medium of example 26 and/or some other example herein, wherein the handover request message may include a protocol data unit (PDU) session ID and a target ID wherein the target ID may be associated with a target RAN.

Example 28 may include the non-transitory computer-readable medium of example 26 and/or some other example herein, wherein the operations further comprise causing to send a create indirect data forwarding tunnel request message to the SMF.

Example 29 may include the non-transitory computer-readable medium of example 26 and/or some other example herein, wherein the operations further comprise identifying a create indirect data forwarding tunnel response message from the SMF.

Example 30 may include a method comprising: determining, by one or more processors of a device, an association of an access and mobility management function (AMF) with a first radio access network (RAN); identifying a handover request message received from the first RAN via the AMF; identifying a request to establish an indirect data forwarding associated with the handover, wherein the request may be received from the first RAN via the AMF; and causing to send a response addressed to the AMF indicating that the indirect data forwarding may be established.

Example 31 may include the method of example 30 and/or some other example herein, wherein the device may be a session management function (SMF), wherein the SMF may be communicatively coupled to at least one of a first user plane function (UPF) and a second UPF, the first UPF and the second UPF are associated with the handover.

Example 32 may include the method of example 30 and/or some other example herein, wherein the handover request message may include a protocol data unit (PDU) session ID and a target ID wherein the target ID may be associated with a target RAN.

Example 33 may include the method of example 30 and/or some other example herein, further comprises: causing to send a create indirect data forwarding tunnel request message to a source UPF; and identifying a create indirect data forwarding tunnel response from the source UPF.

Example 34 may include the method of example 30 and/or some other example herein, further comprises: identifying a handover complete notification received from the AMF; and causing to send a handover complete acknowledgment to the AMF.

Example 35 may include the method of example 30 and/or some other example herein, further comprises causing to send a modification request message to a PDU session anchor (PSA), wherein the modification request message may include a target user plane function (UPF) Internet protocol (IP) address and a tunnel endpoint identification (TEID), the TEID being associated with the indirect data forwarding.

Example 36 may include the method of example 35 and/or some other example herein, further comprises determining a target RAN associated with the handover, and wherein the first RAN may be a source RAN associated with the handover.

Example 37 may include the method of example 36 and/or some other example herein, further comprises determining a source UPF associated with the source RAN and the target UPF associated with the target RAN.

Example 38 may include the method of example 35 and/or some other example herein, further comprises: causing to send a create an indirect data forwarding tunnel request message on a first interface to the target UPF; and identifying a session establishment response message received from the target UPF.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A device, comprising a processor configured to implement a session management function (SMF), wherein the processor is configured to:
   determine an association of an access and mobility management function (AMF) with a first radio access network (RAN);
   identify a handover request message received from the first RAN via the AMF, wherein the handover request message indicates one or more quality of service (QoS) flows;
   identify a request to establish an indirect data forwarding associated with a handover, wherein the request is received from the first RAN via the AMF;
   cause transmission of a first create indirect data forwarding tunnel request message to a source user plane function (UPF);
   cause transmission of a second create indirect data forwarding tunnel request message to a target UPF;
   cause transmission of a modification request message to a protocol data unit (PDU) session anchor (PSA), wherein the modification request message includes a target UPF Internet protocol (IP) address and a tunnel endpoint identification (TEID), the TEID being associated with the indirect data forwarding; and
   cause transmission of a response addressed to the AMF indicating that the indirect data forwarding is established for the one or more QoS flows.

2. The device of claim 1, wherein the processor is further configured to:
   identify a create indirect data forwarding tunnel response from the source UPF.

3. The device of claim 1, wherein the processor is further configured to:
   identify a handover complete notification received from the AMF; and
   cause transmission of a handover complete acknowledgment addressed to the AMF.

4. The device of claim 1, wherein the first RAN is a source RAN associated with the handover, and wherein the processor is further configured to determine a target RAN associated with the handover.

5. The device of claim 4, wherein the processor is further configured to determine that the source UPF is associated with the source RAN and the target UPF is associated with the target RAN.

6. The device of claim 1, wherein the processor is further configured to discontinue employment of the indirect data forwarding.

7. The device of claim 1, wherein the indirect data forwarding includes forwarding data from the first RAN to the second RAN via the source UPF and the target UPF.

8. The device of claim 1, wherein the first create indirect data forwarding tunnel request message includes an internet protocol (IP) address of the source UPF and an IP address of the target UPF.

9. The device of claim 8, wherein the first create indirect data forwarding tunnel request message further includes a TEID for data forwarding.

10. The device of claim 1, wherein the handover request message indicates a need for N2 based handover and a reason for N2 based handover; and
    wherein the reason for N2 based handover comprises one of: a lack of an Xn interface between the first RAN and a second RAN, or a lack of IP connectivity between the second RAN and the source UPF.

11. A method comprising, with one or more processors implementing a session management function (SMF) of a device,
    determining an association of an access and mobility management function (AMF) with a first radio access network (RAN);
    identifying a handover request messages received from the first RAN via the AMF, wherein the handover request message indicates one or more quality of service (QoS) flows;
    identifying a request to establish an indirect data forwarding associated with a handover, wherein the request is received from the first RAN via the AMF;
    causing transmission of a first create indirect data forwarding tunnel request message to a source user plane function (UPF);
    causing transmission of a second create indirect data forwarding tunnel request message to a target UPF;
    causing transmission of a modification request message to a PDU session anchor (PSA), wherein the modification request message includes a target UPF internet protocol (IP) address and a tunnel endpoint identification (TEID), the TEID being associated with the indirect data forwarding; and
    causing transmission of a response addressed to the AMF indicating that the indirect data forwarding is established for the one or more QoS flows.

12. The method of claim 11, wherein the SMF is communicatively coupled to the source UPF and the target UPF, and wherein the source UPF and the target UPF are associated with the handover.

13. The method of claim 11, wherein the handover request message further includes a protocol data unit (PDU) session ID and a target ID, wherein the target ID is associated with a target RAN.

14. The method of claim 11, further comprising:
    identifying a create indirect data forwarding tunnel response from the source UPF.

15. The method of claim 11, further comprising:
    identifying a handover complete notification received from the AMF; and
    causing to send a handover complete acknowledgment to the AMF.

16. The method of claim 11, further comprising:
    determining a target RAN associated with the handover, and wherein the first RAN is a source RAN associated with the handover.

17. The method of claim 11, further comprising:
    identifying a session establishment response message received from the target UPF.

18. The method of claim 11, further comprising:
    deleting the indirect data forwarding tunnel to the target UPF.

19. An apparatus comprising means to perform a method as claimed in claim 11.

20. A non-transitory computer readable medium, having computer-executable instructions stored thereon that, when executed by a processor, cause the processor to implement a session management function (SMF), wherein the instructions comprise instructions that cause the processor to:
   determine an association of an access and mobility management function (AMF) with a first radio access network (RAN);
   identify a handover request message received from the first RAN via the AMF;
   identify a request to establish an indirect data forwarding tunnel associated with a handover, wherein the request is received from the AMF;
   in response to the request to establish the indirect data forwarding tunnel:
      cause transmission of a first create indirect data forwarding tunnel request message to a source user plane function (UPF);
      cause transmission of a second create indirect data forwarding tunnel request message to a target UPF;
      cause transmission of a modification request message to a protocol data unit (PDU) session anchor (PSA), wherein the modification request message includes a target UPF internet protocol (IP) address and a tunnel endpoint identification (TEID), the TEID being associated with the indirect data forwarding; and
      cause transmission of a response addressed to the AMF indicating that the indirect data forwarding is established.

21. The non-transitory computer readable medium of claim 20, wherein the SMF is communicatively coupled to the source UPF and the target UPF, and wherein the source UPF and the target UPF are associated with the handover.

22. The non-transitory computer readable medium of claim 20, wherein the handover request message includes a PDU session ID and a target ID wherein the target ID is associated with a target RAN.

23. The non-transitory computer readable medium of claim 20, wherein the instructions further comprise instructions that cause the processor to:
   identify a create indirect data forwarding tunnel response from the source UPF.

\* \* \* \* \*